United States Patent
Kochan, Jr.

(10) Patent No.: US 9,989,394 B2
(45) Date of Patent: Jun. 5, 2018

(54) AUTOMATIC SHUT OFF VALVE

(71) Applicant: Metropolitan Industries, Inc., Romeoville, IL (US)

(72) Inventor: John R. Kochan, Jr., Naperville, IL (US)

(73) Assignee: METROPOLITAN INDUSTRIES, INC., Romeoville, IL (US)

(*) Notice: Subject to any disclaimer, the term of this patent is extended or adjusted under 35 U.S.C. 154(b) by 138 days.

(21) Appl. No.: 14/165,853

(22) Filed: Jan. 28, 2014

(65) Prior Publication Data

US 2014/0230924 A1    Aug. 21, 2014

Related U.S. Application Data

(60) Provisional application No. 61/765,465, filed on Feb. 15, 2013.

(51) Int. Cl.
| | |
|---|---|
| *G01F 15/00* | (2006.01) |
| *F16K 37/00* | (2006.01) |
| *G01F 1/36* | (2006.01) |
| *E03B 7/07* | (2006.01) |

(52) U.S. Cl.
CPC ............ *G01F 15/005* (2013.01); *E03B 7/071* (2013.01); *F16K 37/005* (2013.01); *G01F 1/363* (2013.01); *Y10T 137/7761* (2015.04)

(58) Field of Classification Search
CPC ...... E03B 7/071; F16K 37/005; G01F 15/005; G01F 1/363; Y10T 137/7761; G05D 7/0623

USPC ...................................... 137/487.5
See application file for complete search history.

(56) References Cited

U.S. PATENT DOCUMENTS

| | | | | |
|---|---|---|---|---|
| 4,730,637 A | * | 3/1988 | White ................. | E03B 7/12 137/468 |
| 5,409,037 A | * | 4/1995 | Wheeler ............. | G01M 3/243 137/487.5 |
| 5,715,866 A | * | 2/1998 | Granger ............. | A01G 25/165 137/487.5 |
| 5,893,388 A | * | 4/1999 | Luker ................. | E03B 7/071 137/456 |
| 5,934,302 A | * | 8/1999 | Nemelka ............ | D06F 33/02 137/1 |
| 6,209,576 B1 | * | 4/2001 | Davis ................. | E03B 7/071 137/460 |
| 7,434,593 B2 | * | 10/2008 | Noll ................... | F16K 15/063 137/15.18 |
| 8,839,815 B2 | * | 9/2014 | Young ................ | F23N 1/005 137/554 |
| 2006/0272830 A1 | * | 12/2006 | Fima .................. | E03B 1/00 169/16 |
| 2007/0084512 A1 | * | 4/2007 | Tegge, Jr. .......... | B63B 13/02 137/487.5 |

(Continued)

*Primary Examiner* — William McCalister
(74) *Attorney, Agent, or Firm* — Husch Blackwell LLP; George S. Pavlik; Michael R. Anderson

(57) ABSTRACT

A shut off valve featuring a flow conduit with a fluid inflow end and a fluid outflow end, at least one electrically actuated flow control element coupled to the conduit with a blocking state and a flow state, control circuits coupled to the element and a local power source coupled at least to the control circuits. Wherein, in response to a received signal from a displaced source, the control circuits switch the element from the flow state to the blocking state.

11 Claims, 3 Drawing Sheets

(56) References Cited

U.S. PATENT DOCUMENTS

2007/0246550 A1\* 10/2007 Rodenbeck ............. E03C 1/057
236/12.11

\* cited by examiner

AUTOMATIC SHUT OFF VALVE

CROSS-REFERENCE TO RELATED APPLICATION

This application claims the benefit of the filing date of U.S. Provisional Application Ser. No. 61/765,465 filed Feb. 15, 2013, entitled, "Automatic Shut Off Valve" which is hereby incorporated by reference as if fully set forth herein.

FIELD

The application pertains to shut off valves to control the inflow of pressurized water or other fluids to a home or commercial facility. More particularly, the application pertains to such valves which include one or more electrically actuated valves, and, can be Internet enabled.

BACKGROUND

It is occasionally necessary or desirable for owners or operators of commercial, business or residential buildings or structures, including multi-unit apartment/condominium buildings, to control, limit or shut off the pressurized water supply. Such circumstances can arise for instance in the event of a water leak (downstream of the proposed automatic shut off valve), during the repair of an appliance or plumbing fixture or where the building or dwelling may be unoccupied for an extended period of time. It can further be desirable for owners to limit or control water usage to manage expenses and to conserve resources for environmental purposes.

In light of such conditions and interests, it is generally known that a valve can be connected to a building's water supply line in order to shut off the water when needed. Such known valves, however, have certain limitations. For example, many known valves are manually operable and/or cannot be actuated from a remote location. In addition, such known valves cannot detect the real-time flow conditions within the water supply line and communicate those conditions to the owner/operator. Thus, in certain instances, there is no way to actually shut off the water or confirm that the water has in fact been shut off without being physically present at the building.

Thus, there is a need for an automatic shut-off valve that can be remotely actuated without in-person manual operation. For purposes of increased reliability, it would additionally be desirable for such a device to feature auxiliary control elements should the primary element malfunction or fail. In addition, there is a further need for an automatic shut-off valve that can detect the status of fluid flow within the pipe or supply line and transmit such information to a displaced device or location over a communication network via a wired or wireless connection.

It would further be beneficial if such device could operate off its own local rechargeable power supply if external power is not available or disrupted. Moreover, it would additionally be beneficial for such device to be able to operate self-sufficiently by being able to recharge the power supply if need be.

DETAILED DESCRIPTION

Figure 1:
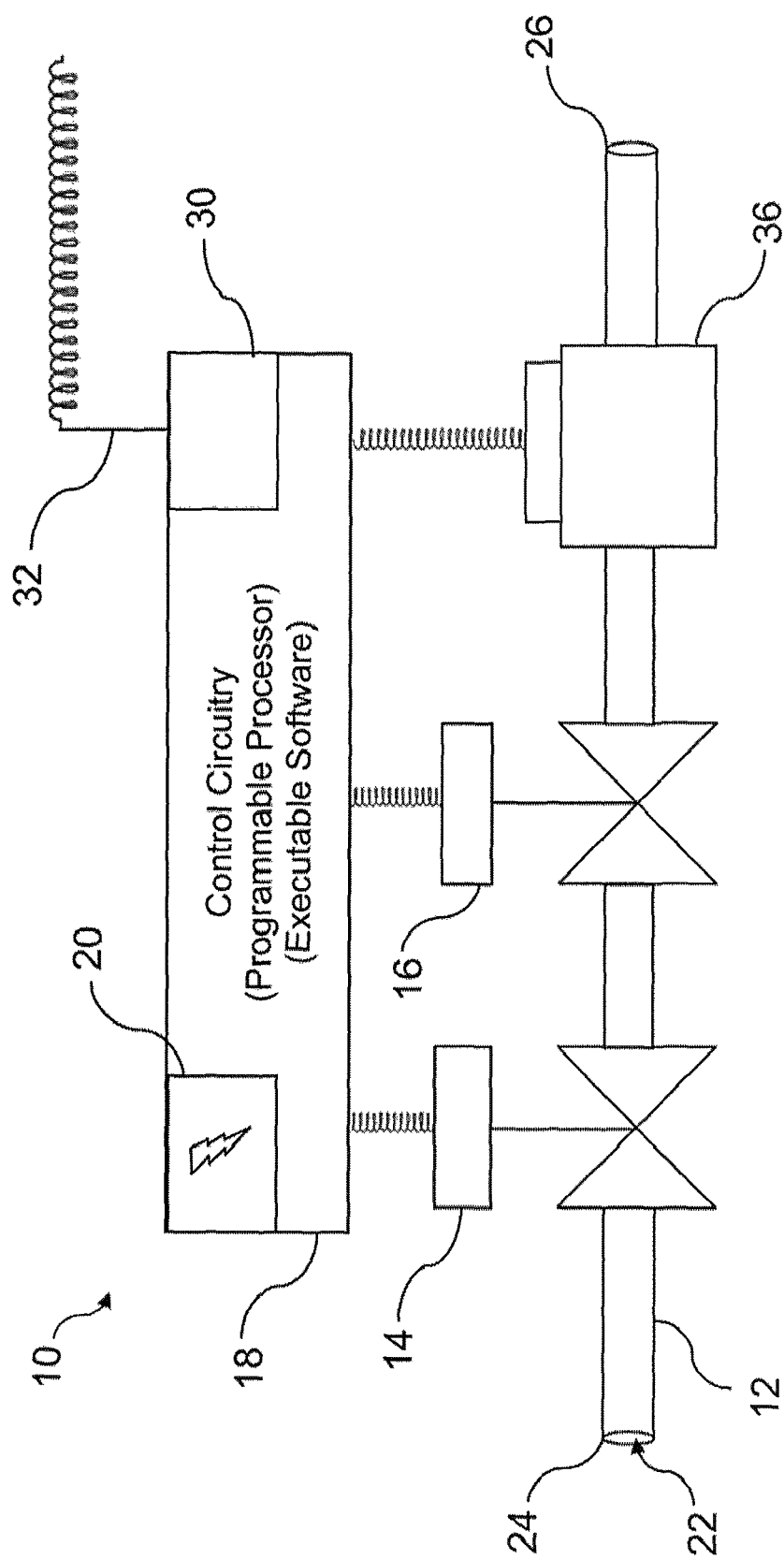
FIG. 1 is a first representative view of a valve according to embodiments disclosed herein.

While disclosed embodiments can take many different forms, specific embodiments hereof are shown in the drawings and will be described herein in detail with the understanding that the present disclosure is to be considered as an exemplification of the principles hereof, as well as the best mode of practicing same, and is not intended to limit the claims hereof to the specific embodiment illustrated.

As described herein, embodiments disclosed herein are directed to an automatic shut off valve incorporating single or multiple electrically actuated valves, a device to detect the fluid flow conditions, and an optional water powered inline generator to energize the valves if external power is not an option for operation. As described herein, the device can be hard wired or fitted with a wireless sensor which can report to a remote monitoring site. Communications can be provided via an internet monitoring portal using a wired or wireless medium.

The valve can be tied into the water feed of a home, business, individual apartments/condos in a multi-unit building or any other application having a pressurized water feed. Once the valve is installed, the owner/operator can, according to the needs of a particular application, set a run limit for the water, such as, for example, 20 minutes. When the set time has run, an alarm prompt can be sent to the motorized or electrically actuated valve which can close the valve and shut down pressurized water supply to the system. The prompt can further provide verification to the owner/operator that the valve has been closed.

If the valve fails to close, one or more secondary valves can be engaged and closed in order to stop the delivery of water. If the alarm prompt is acknowledged, it can be up to the owner/operator/resident to decide to investigate the problem or override the alarm and open the valve based on their knowledge or understanding of the particular equipment or application.

Figure 2:
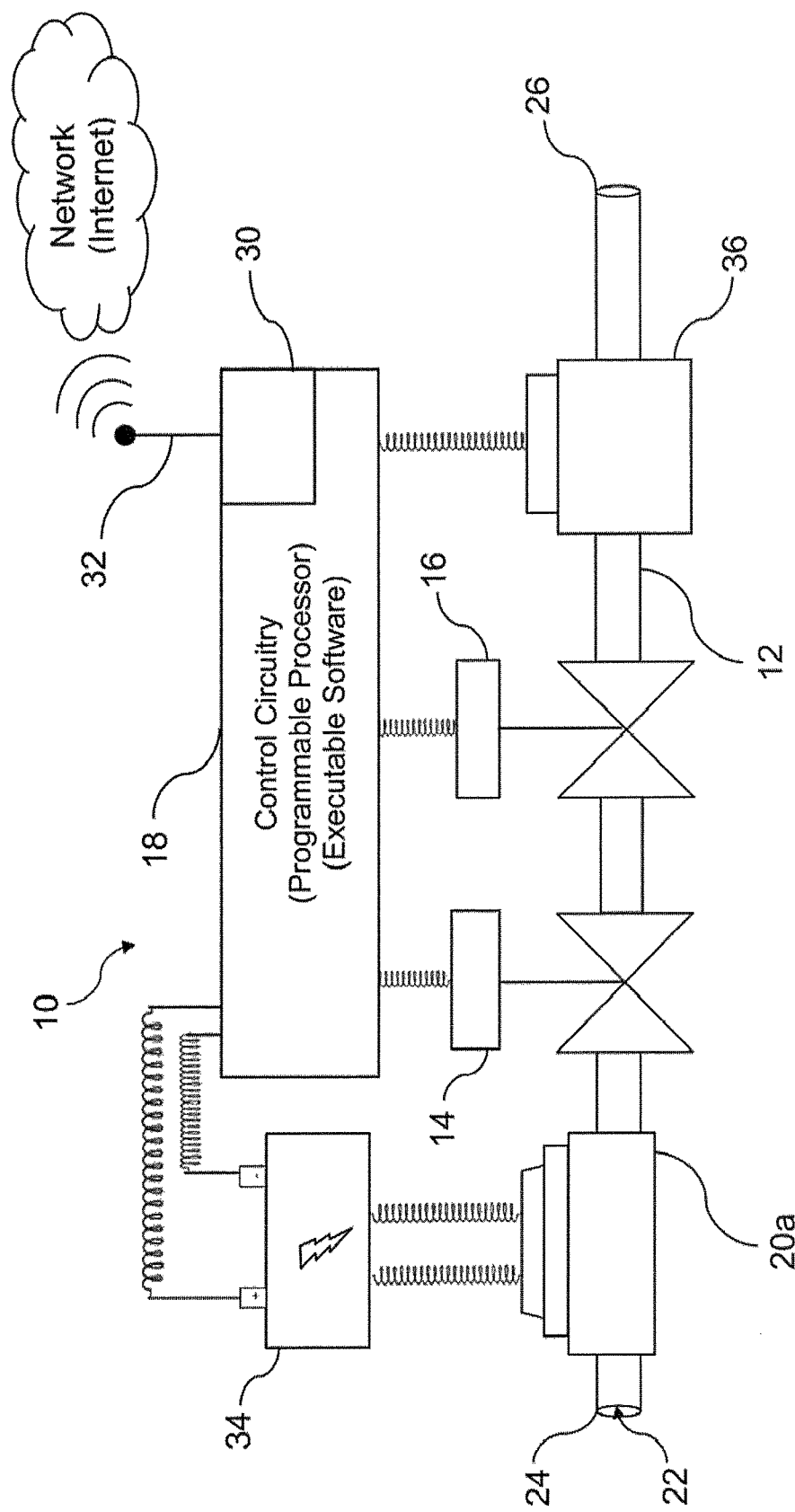
FIG. 2 is a second representative view of a valve according to embodiments disclosed herein.
Figure 3:
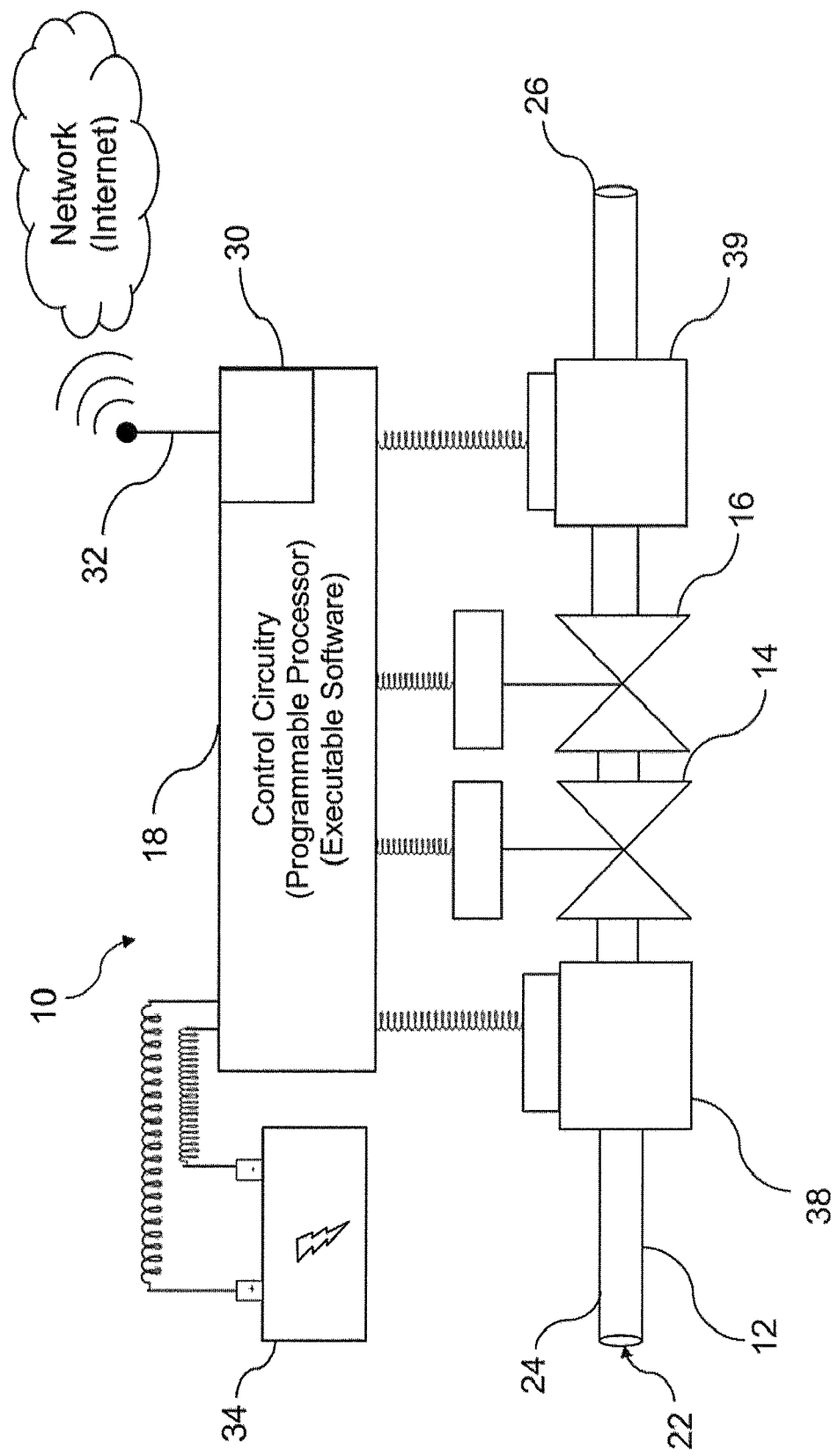
FIG. 3 is a third representative view of a valve according to embodiments disclosed herein.

Now with reference to the figures, FIGS. 1-3 illustrate representative views of an automatic shut-off valve 10 according to embodiments disclosed herein. The valve 10 can feature a flow conduit 12, one or more electrically actuated flow control elements 14, 16, control circuits 18 and a local power source 20. The flow conduit 12 can be a pipe or tube having an interior channel 22, a fluid inflow end 24 and a fluid outflow end 26. The conduit 12 can include, for example, a pipe or tube suitable for carrying water or other liquid and can be made from copper, cast iron, polyvinyl chloride, polypropylene, polyethylene or any other suitable material without limitation.

As illustrated in FIGS. 1-3, the one or more flow control elements 14, 16 can be coupled to the conduit 12 between the inflow end 24 and the outflow end 26. The control elements 14, 16 can be devices such as valves that can regulate, direct or control the flow of fluid through the conduit 12. The control elements 14, 16 can alternate between a blocking state whereby the interior channel 22 of the conduit 12 is partially or entirely obstructed thus restricting or blocking fluid flow and a flow state whereby the interior channel 22 is substantially clear and fluid is permitted to flow through the valve with little or no obstruction.

Although FIGS. 1-3 illustrate the valve having two control elements 14, 16, persons of ordinary skill in the art will understand that the valve 10 can have just one control element or more than two control elements as desired. In addition, it will be further recognized that where a plurality of control elements are provided, the control elements can be of the same type or can be of different types without departing from the novel scope of the subject. Examples of different types of control elements 14, 16 that can be used, include, without limitation: ball valves, butterfly valves, solenoid valves, check valves, disc valves, needle valves and/or any other type of device suitable for controlling fluid flow through the conduit 12.

According to embodiments presented herein, the control elements 14, 16 can be electrically coupled to control circuitry 18a, 18b and a local power source 20 and can be electrically actuated to switch between the flow state and the blocking state in response to a signal received from a displaced source or device. The control circuitry 18 can include a programmable processor for executing control programs and a communications interface 30 for transmitting and receiving signals between a displaced source or device via wired or wireless communication. In the embodiment illustrated in FIG. 1, for example, the valve 10 is configured for wired communication via a hardwire connection 32 to a displaced source or device. In the embodiment illustrated in FIGS. 2 and 3, the valve 10 is configured for wireless communication through a network enabled wireless communications interface 30b via a public or private computer network.

As illustrated in FIGS. 2, the local power source can be a fluid driven in-line generator 20a which is coupled to a rechargeable battery 34 such that the energy associated with the movement of fluid within the channel can be converted to electrical energy to energize the battery 34. The rechargeable battery 34 can alternatively or additionally be powered (via wired or wireless connection) from a displaced source such as for example a fluid-actuated generator, a wind turbine, or solar-activated source.

The valve 10 according to embodiments disclosed herein can also include a flow measurement device for detecting the fluid flow through the interior channel 22 of the conduit 12. As shown in FIGS. 1-2, the flow measurement device can be an electromechanical or optical flow meter 36 which can be affixed to the conduit 12 between the inflow end 24 and outflow end 26 and can gauge the flow rate of fluid through the interior channel 22. The flow meter can also be electrically coupled to the control circuitry 18 such that information regarding the flow rate can be transmitted to a displaced source or device via wired or wireless connection.

FIG. 3 illustrates an alternative embodiment featuring one or more pressure sensors 38, 39 that can be affixed to the conduit 12 adjacent the inflow and outflow ends 24, 26. According to this embodiment, fluid flow can be detected and quantified by measuring the differential pressure within the interior channel 22. Such detection can be accomplished by throttling one of the control elements 14, 16 and examining incoming and outgoing pressure in the system. Hence, a pressure drop detected by the sensors 38, 39 during such throttling exercise provides a positive indication that fluid was flowing in the structure. The sensors 38, 39 can also be electrically coupled to the control circuitry 18 such that information regarding the differential pressure can be transmitted to a displaced source or device via wired or wireless connection and the internet.

From the foregoing, it will be observed that numerous variations and modifications may be effected without departing from the spirit and scope of the invention. It is to be understood that no limitation with respect to the specific apparatus illustrated herein is intended or should be inferred.

It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. A shut off valve comprising:
    a flow conduit with a fluid inflow end and a fluid outflow end;
    a primary electrically actuated flow control element coupled to the conduit with a respective blocking state and a respective flow state;
    a secondary electrically actuated flow control element coupled to the conduit in sequence with the primary electrically actuated flow control element, wherein the secondary electrically actuated flow control element includes a respective blocking state and a respective flow state;
    control circuits and a programmable processor coupled to the primary electrically actuated flow control element and the secondary electrically actuated flow control element, capable of connection to a power source and a displaced electronic device located remotely from the processor and the primary electrically actuated flow control element and the secondary electrically actuated flow control element, and capable of transmitting signals to and receiving signals from the displaced electronic device, the processor being programmable to actuate the primary electrically actuated flow control element between the respective blocking state and the respective flow state by signals received from the displaced electronic device via at least one of a wired or wireless communications interface; and
    a flow meter affixed to the flow conduit and electrically coupled to the control circuitry downstream of the primary electrically actuated flow control element and the secondary electrically actuated flow control element,
    wherein the flow meter measures a flow condition inside the flow conduit,
    wherein the flow condition includes a measurement of a rate of fluid flow through the flow conduit,
    wherein the rate of the fluid flow is transmitted from the communication interface to the displaced electronic device,
    wherein, when the primary electrically actuated flow control element is in the respective blocking state and the flow condition exceeds a predetermined threshold value, the control circuits and the programmable processor generate an alarm prompt,
    wherein, in response to generating the alarm prompt, the control circuits and the programmable processor automatically transition the secondary electrically actuated flow control element from the respective flow state to the respective blocking state, and
    wherein the control circuits and the programmable processor transition the secondary electrically actuated flow control element from the respective blocking state to the respective flow state in response to receiving an override control command from the displaced electronic device.

2. A valve as in claim 1 further comprising the power source, the power source comprising at least one of a fluid driven generator and a rechargeable battery.

3. A valve as in claim 1 further comprising a rechargeable battery coupled to the control circuits.

4. A valve as in claim 3 further comprising the at least one wired, or a wireless communications interface.

5. A valve as in claim 4 wherein the wireless interface includes a computer network enabled interface.

6. A valve as in claim 1 which includes a wireless communications interface which includes a computer network enabled interface.

7. A shut off valve comprising:
a flow conduit with a fluid inflow end and a fluid outflow end;
a primary electrically actuated flow control element coupled to the conduit between the fluid inflow and fluid outflow ends, the flow control element having a respective blocking state and a respective flow state;
a secondary electrically actuated flow control element coupled to the conduit in sequence with the primary electrically actuated flow control element, wherein the secondary electrically actuated flow control element includes a respective blocking state and a respective flow state
control circuits and a programmable processor coupled to the primary electrically actuated flow control element and the secondary electrically actuated flow control element, capable of connection to a power source and a displaced electronic device located remote from the processor and the primary electrically actuated flow control element and the secondary electrically actuated flow control element, and capable of transmitting signals to and receiving signals from the displaced electronic device, the processor being programmable to actuate the primary electrically actuated flow control element between the respective blocking state and the respective flow state by signals received from the displaced electronic device via a communications interface; and
a flow meter affixed to the flow conduit between the fluid inflow and fluid outflow ends downstream of the primary electrically actuated flow control element and the secondary electrically actuated flow control element and electrically coupled to the control circuits,
wherein the flow meter measures a flow condition inside the flow conduit,
wherein the flow condition includes a measurement of a rate of fluid flow through the flow conduit,
wherein the rate of the fluid flow is transmitted from the communication interface to the displaced electronic device,
wherein the communications interface is coupled to the control circuits and the programmable processor, and the signals are transmitted and received between the communication interface and the displaced electronic device,
wherein, when the primary electrically actuated flow control element is in the respective blocking state and the flow condition exceeds a predetermined threshold value, the control circuits and the programmable processor generate an alarm prompt,
wherein in response to generating the alarm prompt, the control circuits and the programmable processor automatically transition the secondary electrically actuated flow control element from the respective flow state to the respective blocking state, and
wherein the control circuits and the programmable processor transition the secondary electrically actuated flow control element from the respective blocking state to the respective flow state in response to receiving an override control command from the displaced electronic device.

8. A valve as in claim 7 further comprising the power source, the power source comprising a rechargeable battery proximate the control circuits and a fluid driven generator affixed to the conduit between the fluid inflow and fluid outflow ends and electrically coupled to the battery.

9. A valve as in claim 7 wherein the wireless interface includes a computer network enabled interface.

10. A shut off valve comprising:
a flow conduit with a fluid inflow end and a fluid outflow end, the flow conduit having an interior channel suitable for carrying liquid;
a plurality of electrically actuated flow control elements coupled to the conduit in sequence between the fluid inflow and fluid outflow ends, the flow control elements having a respective blocking state and a respective flow state, serial flow control through the interior channel being provided between the inflow end and outflow end by the plurality of electrically actuated flow control elements;
control circuits and a programmable processor coupled to the plurality of electronically actuated flow control elements and capable of connection to a displaced electronic device located remote from the processor and the shut off valve;
at least one flow meter affixed to the conduit between the fluid inflow and fluid outflow ends and electrically coupled to the control circuits downstream of the plurality of electrically actuated flow control elements, wherein the flow meter measures a flow condition inside the flow conduit, and wherein the flow condition includes a measurement of a rate of fluid flow through the flow conduit;
a wireless communications interface coupled to the control circuits and the programmable processor that transmits and receives signals bi-directionally with the displaced electronic device, the rate of fluid flow being wirelessly transmitted from the communication interface to the displaced electronic device, the processor being programmable to actuate the plurality of electronically actuated flow control elements between the blocking state and flow state by signals received from the displaced electronic device via the wireless communications interface;
a fluid driven generator affixed to the conduit between the fluid inflow and fluid outflow ends; and
a rechargeable battery proximate the control circuits, the battery electrically coupled to the fluid driven generator and control circuits,
wherein, when a first one of the plurality electrically actuated flow control elements is in the respective blocking state and the flow condition exceeds a predetermined threshold value, the control circuits and the programmable processor generate an alarm prompt, and
wherein, in response to generating the alarm prompt, the control circuits and the programmable processor automatically transition a second one of the plurality electrically actuated flow control elements from the respective flow state to the respective blocking state, and
wherein the control circuits and the programmable processor transition the second one of the plurality electrically actuated flow control elements from the respective blocking state to the respective flow state in response to receiving an override control command from the displaced electronic device.

11. A valve as in claim 10 wherein the wireless interface includes a computer network enabled interface.

* * * * *